United States Patent Office

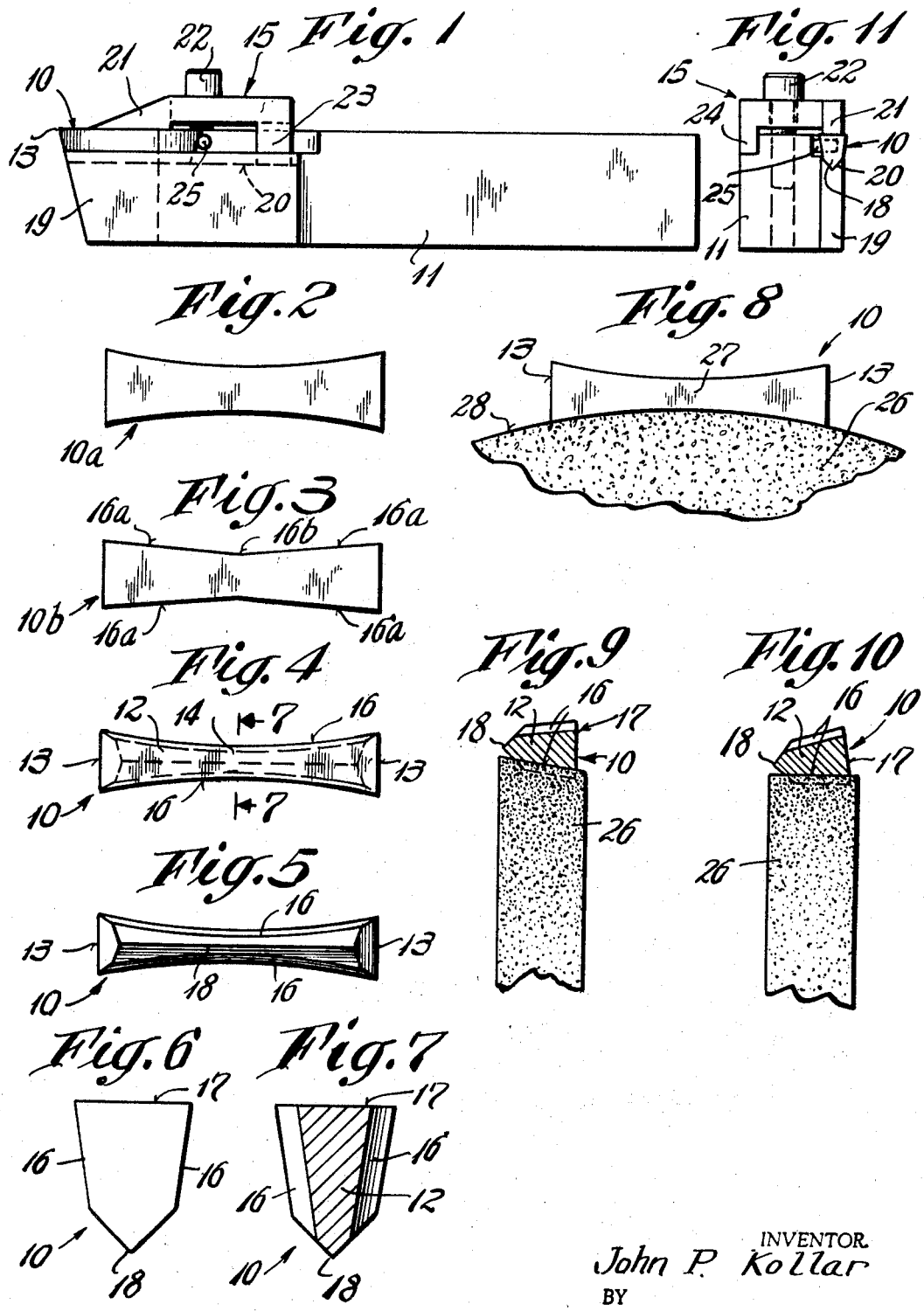
Nov. 4, 1969 — J. P. KOLLAR — 3,475,802
DOUBLE-ENDED CUTTING INSERT AND SHANK THEREFOR
Filed Feb. 9, 1967
INVENTOR
John P. Kollar
BY
Johnson and Kline
ATTORNEYS

3,475,802
Patented Nov. 4, 1969

3,475,802
DOUBLE-ENDED CUTTING INSERT AND SHANK THEREFOR
John P. Kollar, Trumbull, Conn., assignor of one-half to Thomas J. Kollar, Milford, Conn.
Filed Feb. 9, 1967, Ser. No. 614,982
Int. Cl. B26d 1/00
U.S. Cl. 29—96    3 Claims

ABSTRACT OF THE DISCLOSURE

An elongate double-ended cutting carbide insert having concave surfaces on opposite sides made from a blank cast to have both unfinished side surfaces sloping inwardly from both cutting tips, each side surface of the blank being ground with a circular grinding wheel having a radius to produce in one continuous grinding operation a concave chip clearance surface extending in a continuous arc from the cutting tip at one end of the blank to that at the other end.

---

This invention relates to an improved double-ended cutting insert for attachment to a tool shank such as is used for grooving, side cutting, and side and end cutting work, and the method of making the improved insert.

Heretofore, in the manufacture of double-ended cutting inserts for tool shanks, especially when such inserts are made of carbide or like materials, it has been customary to provide a blank, the flat sides of which slope inwardly from the tips of the blank toward a flat mid-section by which the insert is mounted on the tool shank. The side surfaces were then ground to desired dimensions by separately grinding the planar sloping surfaces on each side of the blank and, if necessary, each planar central surface. To do this required indexing the blank relative to the grinding wheel at least four times, and possibly six times, exercising care each time to obtain the desired vertical and back-clearance angle relative to the longitudinal and vertical axes of the insert.

An object of this invention is to substantially reduce the cost of manufacturing double-ended inserts to a degree where it is more economical to discard a used insert than to regrind it. This is accomplished by eliminating some of the grinding operations now required to prepare the side surfaces of cutting inserts.

According to the present invention, the side surfaces of a blank are formed so that each has a transversely flat concave arcuate surface extending continuously between the cutting tip at one end of the insert and that at the other end thereof. With this form of insert, it is possible to grind to dimension the side surfaces of the insert with only two indexing and grinding operations, i.e., one for each side surface.

The said blank may be cast in biconcave form slightly oversize so that it may be ground to finished dimensions, thus reducing the amount of material to be ground away and, more importantly, the time required to do it.

However, the blank may be cast so that each side thereof has two straight segments froming a dihedral angle with the apex midway between the cutting tips of the blank, the apexes on opposite sides of the blank being spaced apart by a distance slightly greater than the ultimate thickness of the narrowest portion of the insert when the latter has been ground to final dimensions. This form of blank is at present preferred because the molds for making the casting therefor may be more easily made, and hence less costly than molds having arcuate surfaces.

Preferably, because of its simplicity, the grinding operation may be performed by chucking the blank in a fixture and bringing the flat peripheral surface of a grinding wheel of determinate diameter and width radially against the side surface of the blank to be finished until the desired dimensions are obtained. The position of the blank is then reversed and the other side surface of the blank is ground in the same manner. The blank and grinding wheel are so positioned that the chords of the arcs so formed are parallel with the longitudinal axis of the blank, thus making both ends of the insert symmetrical.

In order to provide for vertical side clearance during the same grinding operations, the blank may be tilted on its longitudinal axis slightly relative to the peripheral surface of the grinding wheel so that, on the finished insert, the side surfaces, beside being concave, slope downwardly by an amount sufficient to produce the desired clearance angle.

Alternatively, the grinding wheel may be dressed so that its peripheral surface is of such angle as to produce the slope on the side surfaces of the cutter. While it has been stated above that, in performing the grinding operation, the grinding wheel may be moved radially against the blank to provide the concavity in the side of the blank, it is within the scope of this invention to use an alternative method of causing relative movement between the blank and the grinding wheel in a direction parallel to the axis of the latter.

While it is presently considered more convenient to grind the two side surfaces of the insert in separate operations, it is within the purview of this invention to grind both side surfaces simultaneously using two grinding wheels, one on each side of the blank. In such case, to obtain the desired side slope, the axes of the grinding wheels would be tilted or the peripheries of the grinding wheels would be dressed to produce the proper angle on the insert.

Preferably, after the sides are ground, the cutting tips are ground to give them the desired shape according to the work to be done.

One of the advantageous features of the present invention, resulting from the biconcave shape of the insert, is that the width of the cutting tips may be conveniently accurately controlled in the operation of grinding the cavities by merely removing more or less of the material from the blank. In addition, by the present method, blanks having ends of a particular thickness may be used to produce inserts having cutting tips of different widths. For instance, blanks having a width of about 3/8 of an inch may be used to make inserts of from 5/16 to 3/8 of an inch.

The concave side of the insert extend to the cutting edges of the tips at each end of the insert. When the insert is to be used as a grooving tool, the concave surfaces should extend to the outer extremities of the inserts. When the insert is to be used as a side or side and end cutter, in which case the side edges of the cutting tip must be sharp, the concave surfaces may terminate at the cutting part of each tip. But even in this situation, it is advantageous to initially grind the side surfaces so that the concave surfaces extend to the outer extremities of the blank, and then grind the sides of the cutting tip to desired shape and dimensions.

As stated above, it is one of the objects of this invention to reduce the cost of producing inserts for tool shanks so that when the cutting tips are worn or dulled the inserts may be discarded instead of being reground, because the cost of regrinding would not be economically justified. However, the cutting tips of the insert of the present invention, if desired, may be reground to a considerable extent the same as inserts having planar inwardly sloping side surfaces.

Other features and advantages will hereinafter appear.

In the accompanying drawings:

FIGURE 1 is a side elevation of a tool shank showing a cutting insert of the present invention secured in position thereon.

FIG. 2 is a top plan view of a blank from which an insert may be formed.

FIG. 3 is a similar view of a modified form of blank.

FIG. 4 is a top plan view of a cutting insert made according to the present invention.

FIG. 5 is a bottom plan view of the insert shown in FIG. 4.

FIG. 6 is a front elevation of the insert shown in FIGS. 4 and 5.

FIG. 7 is a vertical cross section of the insert shown in FIG. 4 taken on the line 7—7 of FIG. 4.

FIG. 8 is a plan view of the insert shown in FIG. 4 and a fragment of a grinding wheel by which the blank is ground.

FIG. 9 is a cross section of an insert and portion of a grinding wheel which is dressed to provide vertical side clearance on the sides of the insert.

FIG. 10 is like FIG. 9 but shows the manner of providing side clearance by causing the vertical axis of the insert to be tilted relative to the plane of the grinding wheel.

FIG. 11 is a front view of the tool shank shown in FIG. 1, showing the cutter of the present invention secured thereto.

Referring now to FIG. 1 of the drawings, the cutting insert 10 of the present invention is attached to a tool shank 11 which is adapted to be mounted on a tool holder in a lathe, screw machine, or the like, and is used for grooving, side cutting, or separation grinding on work of various materials.

The insert 10 has an elongate body 12 having at each end a cutting tip 13 and an intermediate or middle mounting portion 14, which is engaged by suitable clamping means 15 on the tool shank 11 to be removably held in desired position to engage the work. When the cutting tip 13 at one end of the body becomes dull, the insert is removed from the tool shank, reversed, and reclamped in working position with the sharp tip position to engage the work.

As shown in FIGS. 4, 5 and 7, the insert 10 of the present invention, instead of having longitudinally planar side surfaces as was customary, has each side surface 16 hollow-ground so as to form a transversely planar concave arcuate surface extending continuously from the cutting tip 13 at one end of the body 12 to the cutting tip 13 at the other end thereof, the chords of the arcs being parallel with the longitudinal axis of the body so that the sides of the insert are symmetrical.

In addition to thus providing for the horizontal clearance between the insert 10 and the work, the side surfaces 16 also slope downwardly and inwardly as shown in FIGS. 6 and 7 to provide for vertical clearance.

The top surface 17 of the insert is usually planar while the bottom 18 thereof may have a V-form to center and locate the insert laterally in proper position on a forwardly and laterally extended portion 19 of the tool shank 11, having a V-groove 20 to receive it.

As shown in FIGS. 1 and 2, the insert 10 is placed on the portion 19 with its bottom V-shaped edge 18 in the V-shaped groove 20 and is held in place by a forwardly projecting arm 21 of the clamping block 15 engaging the top surface of the insert at the mounting portion 14 by a screw 22 passing through the block 15 into the body of the shank.

In order to align the block 15 with the shank, the block has a depending lug 23, the bottom of which is V-shaped to engage in the groove 20 of the shank behind the insert. The opposite side of thec lamping block 15 has a portion 24 engaging a shoulder on the opposite side of the shank which serves as a fulcrum on which the block may tilt to firmly engage the cutter and the V-groove when the screw 22 is tightened.

An important feature of the invention is the provision of an improved backstop for the insert to resist horizontal movement of the insert due to the pressure exerted thereon by the work. This backstop, according to the present invention, is in the form of a pin 25 which is secured in the shank to laterally extend therefrom and engage the inner (idle) cutting tip 13. By making the pin cylindrical, it will make line or point contact with the tip regardless of the form of the end cutting surface of the tip. Hence, according to the present invention, a specially formed backstop is not needed for tips having various cutting surfaces.

The insert of the present invention is stronger than inserts heretofore proposed because it is less likely to break when side thrusts are applied to the cutting tip when performing work. This is because there are no weakened areas formed by abruptly going from a thick cutting portion to a thin mounting portion, the cutting insert of this invention gradually decreasing in thickness from the cutting points to the longitudinal center of the insert.

The insert may, of course, be made from a suitable blank from bar stock or a casting. When it is required that the insert be made from carbide steel, or other material that is hard or hard to work, it is preferable to make the blank as a casting.

The blank 10a, FIG. 2, according to this invention, may be cast in biconcave form, but somewhat oversize so that it can be ground to finished dimensions and desired smoothness. Since the costs of the molds for such a blank are high because of the arcuate surfaces required to make the biconcave casting, it is at present considered more economical to cast the blank 10b in substantially the form shown in FIG. 3, in which the side surfaces 16a of the blank are planar sloping toward the center 16b of the blank and forming a dihedral angle between them. With this form of blank, very little material needs to be removed to finish-grind the body to the desired biconcave form shown in FIGS. 4 and 5.

As stated above, applicant's method of manufacturing the improved cutting insert comprises the steps of preparing a suitable blank and grinding the sides of the blank with a circular grinding wheel to finished biconcave form, after which the cutting tips 13 may be ground to desired shape, if necessary, according to the work to be done.

The grinding wheel 26, a segment of which is shown in FIG. 8, has a radius which is selected so that the waist 27 of the finished insert has the thickness required for strength and, at the same time, the tips 13 have the desired width. With a grinding wheel having a correct radius, it is merely necessary to chuck the blank 10a or 10b in a fixture and bring the flat peripheral surface 28 of the grinding wheel 26 radially against the insert. If, as is preferable, the width of the wheel 26 is as wide or greater than that of the insert, no lateral movement of the wheel is necessary.

After one side of the insert has been ground, it is released from the chucking fixture, reversed, and reclamped in the latter; then the other side of the insert is ground in the same manner as the first.

As noted above, vertical clearance is provided by sloping the sides of the insert downwardly and inwardly. This shape can be obtained while grinding the surface by dressing the periphery of the grinding wheel so that it matches the inclination of the side surfaces as shown in FIG. 9. This operation can also be performed with a grinding wheel having its peripheral surface at a right-angle to the insert and tilting the grinding wheel or the insert as indicated in FIG. 10.

With regard to the downward and inward sloping of the sides of the insert, this can be accomplished entirely in the grinding operation, in which case the sides of the blank may be perpendicular and parallel, or it can be accomplished by casting the blank so as to have the downwardly and inwardly tapering surfaces, and this method at present appears to be preferable, since less material needs to be removed from the blank in finish-grinding.

Variations and modifications may be made within the scope of this invention and portions of the improvements may be used without others.

I claim:

1. A shank for a cutting insert comprising a body adapted to be mounted in a tool holder of a lathe or the like, the forward end of the shank having a projecting insert support having a V-shaped groove parallel to the body for receiving a cutting insert having a longitudinal V-shaped ridge on its bottom edge to rest in and be aligned by the groove, a clamping block supported by the forward end of the shank and having a portion, the bottom of which has a V-shaped ridge to lie in said V-shaped groove and align the clamping block with the insert support, the block having a forward end overlying the top surface of the insert, and a clamping screw passing through the clamping block and into the body of the shank which, when tightly secured, causes the insert to be clamped to the shank with a cutting tip projecting from the insert support.

2. The shank for a cutting insert as defined in claim 1, having a cylindrical pin projecting laterally from the shank in position to engage and position a cutting tip at the inner end of the insert and resist inward longitudinal movement of the insert under pressure from the work.

3. A shank for a cutting insert as defined in claim 1 in which the clamping block has a depending lug which engages a shoulder on the side of the shank opposite said portion having the V-shaped groove, said shoulder serving as a fulcrum on which the block may tilt to firmly engage the cutter and the V-groove when said screws are tightened.

References Cited

UNITED STATES PATENTS

| | | | |
|---|---|---|---|
| 2,737,705 | 3/1956 | Novkov | 29—96 |
| 2,964,833 | 12/1960 | Novkov | 29—95 |
| 3,125,798 | 3/1964 | Stein | 29—98 |
| 3,205,558 | 9/1965 | Stier | 29—96 |

HARRISON L. HINSON, Primary Examiner